United States Patent [19]

Laska et al.

[11] 4,165,176
[45] Aug. 21, 1979

[54] PHOTOGRAPHIC FILM MEASUREMENT WITH INTERCHANGEABLE LIGHT GUIDING MODULES

[75] Inventors: Ronald C. Laska, Minnetonka; Wayne R. Pierce, Edina, both of Minn.

[73] Assignee: Pako Corporation, Minneapolis, Minn.

[21] Appl. No.: 891,815

[22] Filed: Mar. 30, 1978

[51] Int. Cl.² .................................... G03B 27/78
[52] U.S. Cl. ................................. 355/68; 355/83
[58] Field of Search .......................... 355/35–38, 355/67–71, 83, 88, 1; 356/202, 203

[56] References Cited

U.S. PATENT DOCUMENTS

| | | | |
|---|---|---|---|
| 3,479,119 | 11/1969 | Miller et al. | 355/68 |
| 3,888,580 | 6/1975 | Amano et al. | 355/38 |
| 3,891,317 | 6/1975 | Walker | 355/68 |
| 3,944,362 | 3/1976 | Dailey | 355/38 |
| 4,017,179 | 4/1977 | Pone, Jr. et al. | 355/38 |
| 4,094,604 | 6/1978 | Payrhammer et al. | 355/38 |

Primary Examiner—L. T. Hix
Assistant Examiner—W. J. Brady

Attorney, Agent, or Firm—Kinney, Lange, Westman and Fairbairn

[57] ABSTRACT

A photographic printer includes an automatic film measurement system which provides measurements of a film negative at defined discrete or continuous areas. The measurement system includes a light source on one side of the film, an array of light sensors on the opposite side of the film, and a plurality of interchangeable first light-guiding modules. The interchangeable modules are used with different size film and are interposed between the film and the array of light sensors. Each module has a plurality of light-conducting channels which have their first ends exposed at the first surface proximate the film and have their second ends exposed at a second surface proximate the array. The pattern at the second surface corresponds to the array of light sensors so that the light sensors receive light from different portions of the film through the light-conducting channels. In preferred embodiments, a plurality of interchangeable second light-guiding modules are also provided for use with different size films. These second interchangeable modules are interposed between the light source and the film.

9 Claims, 9 Drawing Figures

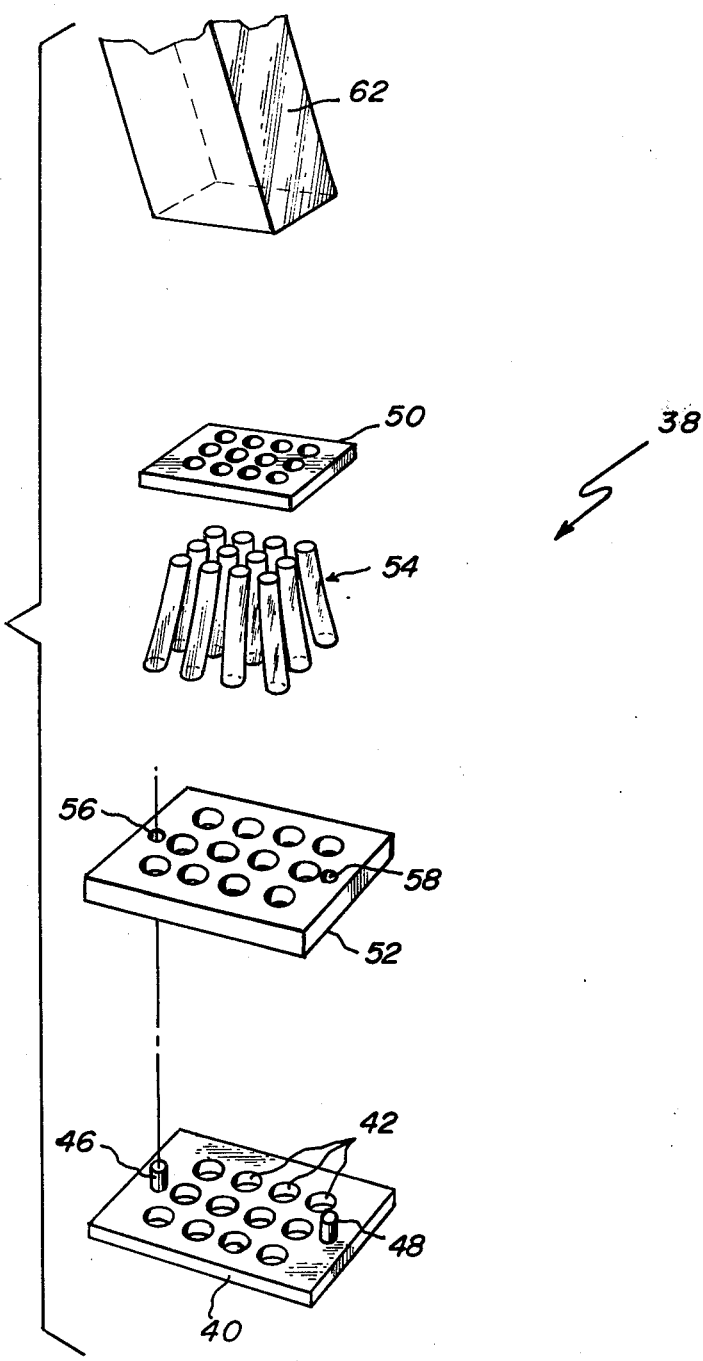

PHOTOGRAPHIC FILM MEASUREMENT WITH INTERCHANGEABLE LIGHT GUIDING MODULES

BACKGROUND OF THE INVENTION

The present invention relates to photographic printing systems. In particular, the present inventnion is a film measurement system which measures the optical characteristics of the photographic film prior to printing.

Photographic printers produce color or black and white prints or transparencies from photographic film originals (generally negatives). High intensity light is passed through the film and imaged on the photosensitive print medium (film or paper). The photographic emulsion layer on the print paper pr film is exposed and subsequently processed to produce a print or transparency of the scene contained in the original.

Automatic photographic printers often include automatic density correction (ADC) or color or density scanning systems which provide measurements of the transmission density of the negative at defined discrete or continuous areas, as opposed to an average or integrated measurement over the entire negative. The measurements of the negative so derived can be used as a sole means of exposure determination, or in conjunction with other measurements to calculate the proper exposure. Examples of these mechanisms are described in the following U.S. Pat. Nos.: Stimson 3,232,192; Wick et al 3,345,309; Bowker et al 3,519,347; Wick et al 3,523,728; Harvey 3,669,553; Rickard et al 3,690,765; Huboi et al 3,694,074; Zahn et al 3,709,613; Paulous 3,724,947; Huboi et al 3,790,275; Zahn et al 3,813,158; Crete et al 3,873,200; Amano et al 3,888,580; Dailey 3,944,362; Pone, Jr. et al 4,017,179.

Some of the systems described in these patents use moving optical elements or a cathode ray tube to provide the desired scanning, while other systems have used one or more sensors in conjunction with optical prisms or fibers to view different portions of the negative. In general, a system without moving optical elements is desirable from a cost, size and reliability standpoint.

One problem which all of these systems encounter is the different film sizes which may be printed by the photographic printer. The standard film sizes (110, 126, and 135) differ significantly in size. The 110 size film presents a particular problem because of its extremely small size.

Some of the prior art systems have simply used the same optical system for all film sizes. As a result, the larger size films (126 and 135) yield far more data points at a proportionately smaller measurement spot size to frame size than does 110 size film, thereby requiring excess data manipulation or multiple algorithms to handle the data. Alternatively, some systems have used completely different optical and sensor systems for each film size. This is objectionable from a cost standpoint and from a user standpoint due to the complicated changes which must be made each time a different size film is to be printed.

SUMMARY OF THE INVENTION

The present invention is an improved film scanning or measurement system which provides a low cost and simple changeover from one film size to another. The system of the present invention includes an array of light sensors which is used for all of the film sizes. A plurality of interchangeable first light-guiding modules are provided for use with the different size films. Each module has a first surface which is proximate the film and a second surface which is proximate the array of light sensors when the module is in position. Each of the first light-guiding modules has a plurality of light-conducting channels with their first ends exposed at the first surface in a predetermined pattern which depends upon the particular module and film size, and second ends exposed at the second surface in a pattern corresponding to the array of light sensors. The light sensors of the array, therefore, receive light from the different portions of the film through the light-conducting channels.

BRIEF DESCRIPTION OF THE DRAWINGS

FIG. 5 is an exploded view of the light-guiding module shown in FIGS. 4A and 4B.

DETAILED DESCRIPTION OF THE PREFERRED EMBODIMENTS

In the present invention, the film scanning or sensing system used for automatic density or color correction is performed by a stationary sensor array which is used for all film sizes. In order to achieve the same pattern of measurement points for each film size, a set of first interchangeable light-guiding modules are provided. Each module is associated with a particular film size and directs light from individual locations on the film to the stationary array of light sensors.

The system of the present invention has several advantages over the prior art systems. First, it is compatible with the various film sizes by means of a simple change of parts. Second, the pattern and the number of points at which measurements are taken can be identical for each film size. Third, the photographic information content (i.e. the ratio of sensed spot area to film frame area) may be maintained constant despite film size changes. Fourth, no moving parts are required for scanning the film. Fifth, only a single array of detectors is used for all film sizes, which is advantageous both from a cost standpoint and from an electrical calibration and connection standpoint. Sixth, it allows great design flexibility in the physical location of the sensor array.

In a preferred embodiment of the present invention, each light-guiding module is mounthed in an interchangeable neghold assembly. Since the neghold must be changed anyway in order to accommodate the different film sizes, the change of light-guiding modules involves no additional effort on the part of the operator.

Figure 1:
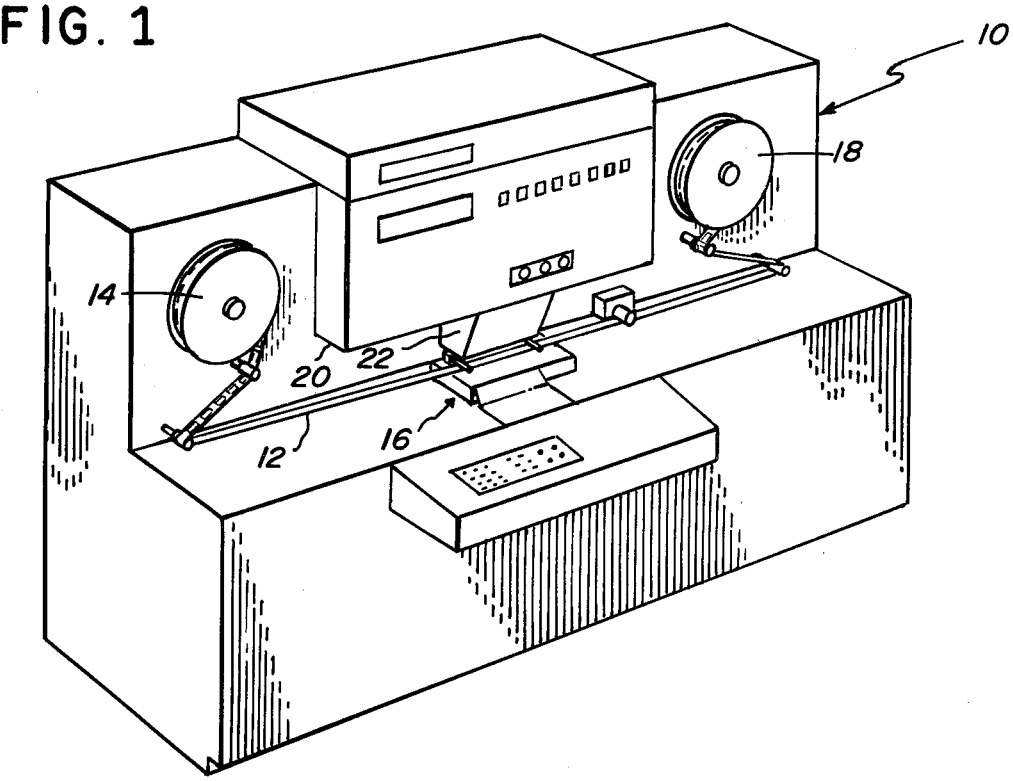
FIG. 1 shows a photographic printer

FIG. 1 shows a photographic printer 10 which preferably utilizes the improved film measurement system of the present invention. Photogrpahic film 12 is supplied from supply reel 14 past a neghold location 16 to take-up reel 18. Neghold location 16 includes a measurement station at which the automatic density or color measurements are made and a print station at which the actual printing operation occurs.

Light for the measurement and print stations is provided by measurement and print lamps (not shown) in lamphouse assembly 20. The light is directed from lamphouse 20 to the measurement and print stations by drop cone assembly 22.

Figure 2:
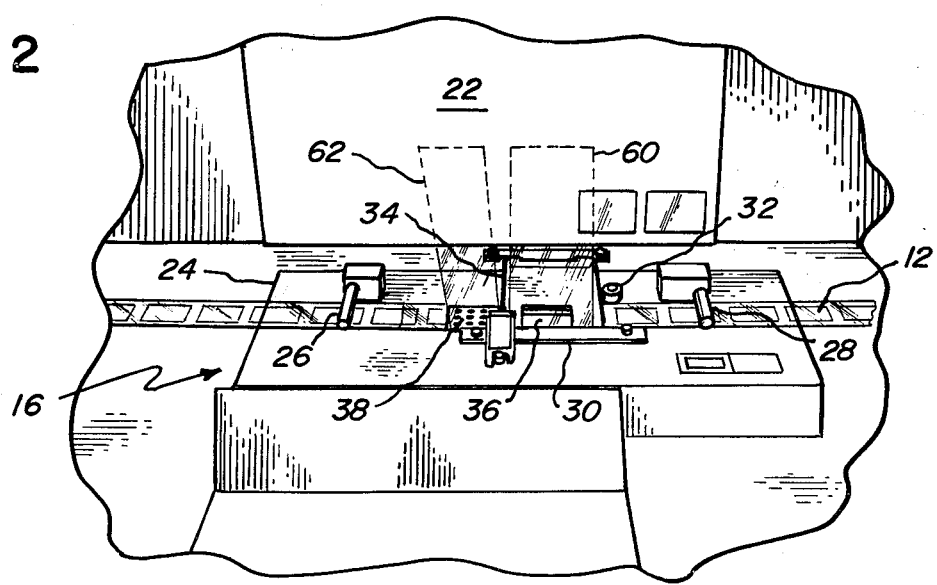
FIG. 2 shows the exposure and measurement gates of the printer of FIG. 1 with the neghold assembly in place.

FIG. 2 shows a more detailed view of neghold location 16. In the embodiment shown in FIG. 2, neghold assembly 24, which is the assembly used for 110 size film, is shown installed at neghold location 16. Neghold 24 includes film guiding members 26, 28, 30, and 32; film clamping mechanism 34; a print gate 36 through which light from drop cone assembly 22 passes through film 12 into printer 10; and a light-guiding module 38. Film is advanced from left to right in the view shown in FIG. 2 so that a particular frame of the film first passes the measurement station defined by light guide module 38, where measurements of individual points on the film are measured. The film is then advanced to print gate 36, where print is made.

Figure 3:
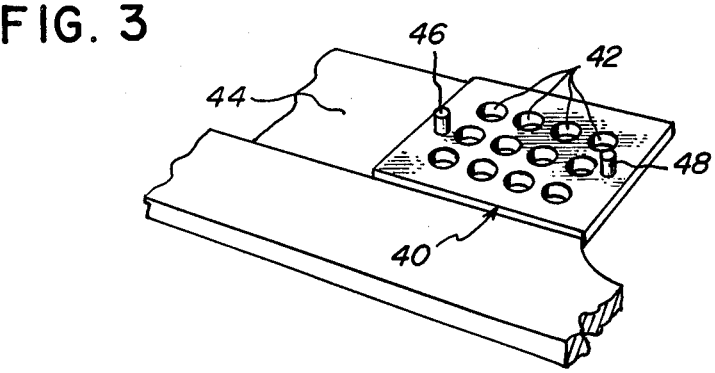
FIG. 3 shows the sensor array of the present invention.

FIG. 3 shows sensor array 40, which is located at the neghold location 16 below the top surface of neghold 24. Sensor array 40, as shown in FIG. 3, includes twelve individual photosensors 42. In a preferred embodiment, these twelve sensors are silicon photovoltaic sensors which are mounthed on a printed circuit board (not shown). An aperture plate 44 overlies the sensor array. Proper positioning of the light-guiding module is assured by locating pins 46 and 48, which are received in locating holes in the bottom plate of the light guide module.

Figure 4A:
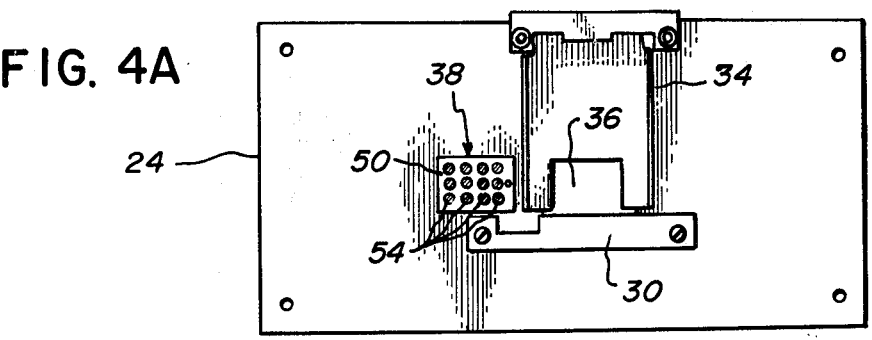
FIGS. 4A and 4B show top and bottom view of a neghold assembly for 110 size film which includes the light-guiding module of the present invention.
Figure 4B:
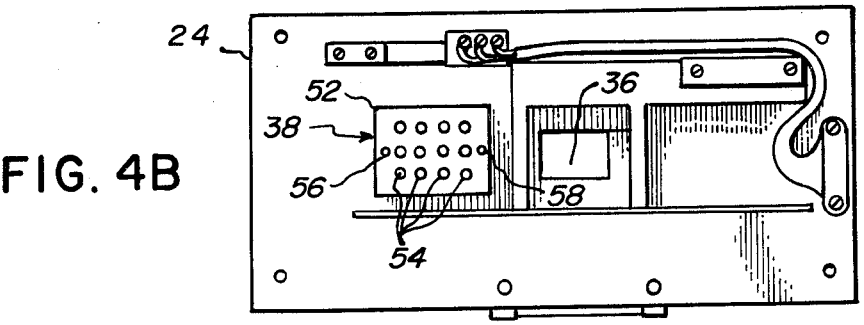

FIGS. 4A and 4B show top and bottom views of the neghold assembly 24. As shown in FIGS. 4A and 4B, light-guiding module 38 includes a top plate 50, a bottom plate 52, and light-conducting channels 54 which extend from the top plate 50 to the bottom plate 52. In a preferred embodiment, the light-conducting channels 54 are fiber optic bundles which conduct the light from the film to light sensor array 40. The position of the ends of light-conducting channels 54 at the top plate 50 corresponds to the desired pattern to be sensed on the film. The pattern and spacing of channels 54 at bottom plate 52 corresponds to the position of the individual sensors 42 of sensor array 40. Bottom plate 52 includes locating holes 56 and 58, which mate with locating pins 46 and 48 to properly locate the ends of channels 54 over the individual sensors 42 of array 40.

FIG. 5 is an exploded view of light guide module 38 removed from neghold assembly 24. Module 38 includes top plate 50, bottom plate 52, and fiber optic bundles 54. As shown in FIG. 5, each fiber optic bundle is connected between one of the apertures of top plate 50 and a corresponding aperture in bottom plate 52. The apertures of top plate 50 correspond to the desired measurement location on the 110 size film, while th apertures in bottom plate 52 correspond to the individual sensors of sensor array 40.

Figure 6A:
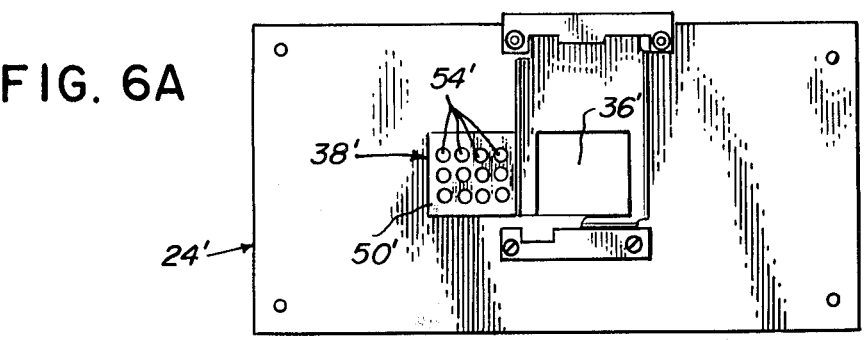
FIGS. 6A and 6B show a top view of a neghold assembly for 126 size film which includes the light-guiding module of the present invention.
Figure 6B:
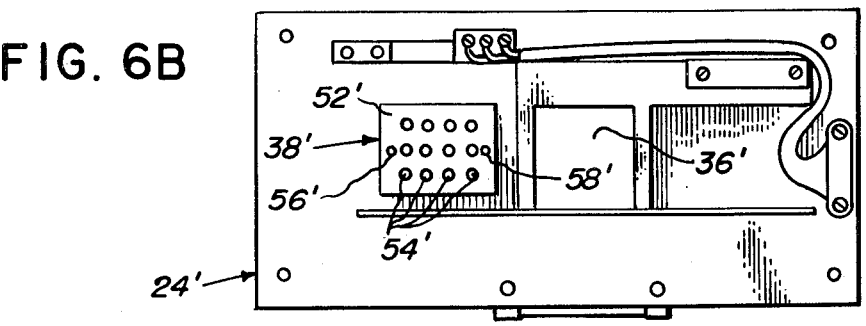

FIGS. 6A and 6B show top and bottom views of the neghold assembly 24' for 126 size film, drawn to the same scale as the neghold assembly 24 for 110 size film. As shown in FIGS. 6A and 6B, the size of light guide module 38' and print gate 36' are larger for 126 size film as compared to 110 size film. In order to provide the same distribution or pattern of sensed points and maintain the same ratio of sensed point area to film frame area, the light-conducting channels 54' exposed at top plate 50' of module 38' are more widely spaced and are of larger diameter than those shown in FIG. 4A.

Bottom plate 52' of module 38' corresponds in size to the sensor array 40, and the light-guiding channels 54' in FIGS. 6A and 6B direct the light from the individual points at the top plate 50' of module 38' to the sensors 42 of array 40.

As in the case of module 38 for 110 size film, module 38' for 126 size film includes locating holes 56' and 58' which cooperate with locating pins 46 and 48 to properly position module 38' over array 40.

In a preferred embodiment of the present invention, a similar neghold assembly for 135 size film (not shown) is also provided with the printer. The spacing and size of the light-conducting channels of the 135 size module are proportionately larger than the spacing and size of the channels of the 110 module. In one preferred embodiment, the spacing of the channels of both the 126 and 135 modules is the same and corresponds exactly to the spacing of the sensors 42 of array 40.

Figure 7:
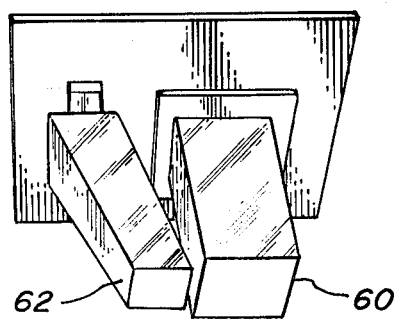
FIG. 7 shows one of the interchangeable second light-guiding modules which are positioned in the drop cone assembly between the lamps and the measurement and print gates.

FIG. 7 shows one of the interchangeable drop cone modules which are mounted in drop cone 22 to direct light from the measurement lamp and the print lamp to the measurement and print gates, respectively. FIG. 7 is the module used with 126 size film, and similar modules are provided for 110 and 135 size film. In each case, the module includes a plexiglass print light guide 60 which directs light from the print lamp to the print gate and a plexiglass measurement light guide 62 which directs light from the measurement lamp to the measurement gate. The size and positions of the bottom surfaces of light guides 60 and 62 differs, of course, depending upon the particular film size.

In conclusion, the film measurement system of the present invention is a significant improvement over the prior art systems. First, it permits the same number of data points in the same pattern for all film sizes. Second, it uses fixed sensors which are never changed despite the changes in film size. Third, it uses light-guiding modules which may be attached to each neghold assembly, so that no additional change of parts is required. Fourth, it permits measurement of all of the various film sizes with an array of sensors and no moving parts. Fifth, the ratio of the sensed point area to the film frame area may be maintained constant, thereby avoiding excessive data manipulation or multiple algorithms for handling measurements made from different size films.

Although the present invention has been described with reference to preferred embodiments, workers skilled in the art will recognize that changes may be made in form and detail without departing from the spirit and scope of the invention.

What is claimed is:

1. In a photographic printer, an improved film measurement system comprising:
an array of light sensors, the light sensors disposed in a fixed pattern;
a plurality of interchangeable first light-guiding modules for use with different size films, each module having a first surface which is proximate the film and a second surface which is proximate the array of light sensors when the module is in position, and each module having a plurality of light-conducting channels having their first ends exposed at the first surface in a light-receiving pattern which depends upon the particular module and film size and having their second ends exposed at the second surface in a light-transmitting pattern corresponding to the fixed pattern of the array of light sensors, whereby the light sensors of the array receive light from different portions of the film through the light-conducting channels.

2. The invention of claim 1 and further comprising: measurement light source means positioned on an opposithe side of the film from the array of light opposite the measurement light source means providing light to the film.

3. The invention of claim 2 and further comprising: a plurality of interchangeable second light-guiding modules for use with different film sizes, each module having a receiving surface which receives light from the measurement light source and a transmitting surface which rovides light to the film when the module is in position, each module having a different size transmitting surface depending upon the particular film size with which it is associated.

4. The invention of claim 1 wherein the ratio of the area of the first ends of the light-conducting channels of each first light-guiding module to the area of a film frame of the particular film size associated with that first light-guiding module is essentially a constant.

5. The invention of claim 1 wherein the light-receiving patterns of the plurality of interchangeable first light-guiding modules are essentially the same pattern but with the spacing of the exposed first ends being different depending upon the film size associated with the particular first light guiding module.

6. The invention of claim 1 wherein the photographic printer includes a plurality of interchangeable negholds for guiding and holding different size films at a print station of the printer and wherein each of the plurality of interchangeable first light-guiding modules is attached to a corresonding interchangeable neghold for its particular film size.

7. The invention of claim 1 wherein the array of light sensors includes first positoning means for assuring proper positioning of the modules over the array of light sensors, and wherein each of the interchangeable first light-guiding modules includes second positioning means which cooperate with the first positioning means.

8. The invention of claim 7 wherein the first positoning means comprises a plurality of locating pins and herein the second positioning means comprises a plurality of locating holes for receiving the locating pins.

9. A photographic printer comprising:
a printing station at which light is passed through a photographic film to expose a photosensitive medium;
a film measurement station at which measurements of the transmisson density of the film at defined areas are made prior to printing at the printing station;
a film transport system for transporting film to the film measurement station and then to the printing station;
measurement light source means located on one side of the film for providing light to the film at the film measurement station;
an array of light sensors at the film measurement station on an opposite side of the film from the measurement light source means, the light sensors being disposed in a fixed pattern; and
a plurality of interchangeable first light-guiding modules capable of being positioned between the film and the array, each of the plurality of interchangeable first light-guiding modules being associated with a particular size film and having a first surface which is proximate the film and a second surface which is proximate the array of light sensors when the module is in position, and each module having aplurality of light-conducting channels, having their first ends exposed at the first surface in a light-receiving pattern which depends upon the film size associated with the particular module and having their second ends exposed at the second surface in a light-transmitting pattern corresponding to the fixed pattern of the array of light sensors, whereby the light sensors receive light transmitted through different portions of the film and through the light-conducting channels.

* * * * *